United States Patent
Gierl-Mayer et al.

(10) Patent No.: US 10,960,490 B2
(45) Date of Patent: Mar. 30, 2021

(54) FRICTION STIR WELDING TOOL

(71) Applicants: Technische Universitaet Wien, Vienna (AT); STIRTEC GmbH, Premstaetten (AT)

(72) Inventors: Christian Gierl-Mayer, Vienna (AT); Herbert Danninger, Vienna (AT); Thomas Weinberger, Graz (AT); Gunter Figner, Graz (AT)

(73) Assignees: TECHNISCHE UNIVERSITAET WIEN, Vienna (AT); STIRTEC GMBH, Premstaetten (AT)

( * ) Notice: Subject to any disclaimer, the term of this patent is extended or adjusted under 35 U.S.C. 154(b) by 165 days.

(21) Appl. No.: 15/769,781

(22) PCT Filed: Oct. 31, 2016

(86) PCT No.: PCT/AT2016/060093
§ 371 (c)(1),
(2) Date: Apr. 20, 2018

(87) PCT Pub. No.: WO2017/070725
PCT Pub. Date: May 4, 2017

(65) Prior Publication Data
US 2018/0311761 A1 Nov. 1, 2018

(30) Foreign Application Priority Data
Oct. 30, 2015 (AT) .................... A 702/2015

(51) Int. Cl.
*B23K 20/12* (2006.01)
(52) U.S. Cl.
CPC ................. *B23K 20/1255* (2013.01)
(58) Field of Classification Search
None
See application file for complete search history.

(56) References Cited

U.S. PATENT DOCUMENTS

2002/0011509 A1 1/2002 Nelson et al.
2004/0238599 A1 12/2004 Subramanian et al.
(Continued)

FOREIGN PATENT DOCUMENTS

DE 102005018674 A1 10/2006
EP 2149437 A1 2/2010
(Continued)

OTHER PUBLICATIONS

English Translation of International Preliminary Report on Patentability dated May 3, 2018 in International Application No. PCT/AT2016/060093.
(Continued)

*Primary Examiner* — Devang R Patel
(74) *Attorney, Agent, or Firm* — Panitch Schwarze Belisario & Nadel LLP

(57) ABSTRACT

A friction stir welding tool includes a rotation-symmetrical shaft having a proximal end, a distal end, and a pin, which is arranged concentrically about the rotation axis and which has a smaller diameter than the shaft at the proximal end thereof, and thus projects as compared to a shoulder region of the shaft. The shaft, at least in the shoulder region, and the pin each consists of a high-temperature-resistant metal or an alloy thereof. The pin and/or the shaft in the shoulder region consist of or are coated by a composite material, which substantially consists of molybdenum, tungsten, niobium or tantalum or an alloy of at least one of these metals, and a reinforcement phase embedded therein and consisting of at least one material having a Mohs hardness >6, a micrometer particle size, and a free enthalpy of formation at 1300 K of less than −350 kJ/mol $O_2$.

9 Claims, 3 Drawing Sheets

(56) References Cited

U.S. PATENT DOCUMENTS

| | | | |
|---|---|---|---|
| 2005/0117984 A1* | 6/2005 | Eason | B22F 3/15 |
| | | | 408/144 |
| 2005/0249978 A1* | 11/2005 | Yao | B23K 20/1255 |
| | | | 428/699 |
| 2006/0032891 A1* | 2/2006 | Flak | B23K 20/1225 |
| | | | 228/112.1 |
| 2007/0119276 A1 | 5/2007 | Liu | |
| 2012/0248175 A1* | 10/2012 | Moriguchi | B23K 20/1255 |
| | | | 228/112.1 |
| 2014/0299651 A1 | 10/2014 | Stotler et al. | |
| 2014/0312099 A1* | 10/2014 | Ederyd | B23K 20/1245 |
| | | | 228/112.1 |

FOREIGN PATENT DOCUMENTS

| | | |
|---|---|---|
| EP | 2076352 B1 | 10/2013 |
| GB | 2402902 A | 12/2004 |
| WO | 2008102209 A2 | 8/2008 |

OTHER PUBLICATIONS

Search Report dated Aug. 22, 2016 in AT Application No. A 702/2015.

Zhang et al, "Stir zone microstructure of commercial purity titanium friction stir welded using pcBN tool", Materials Science and Engineering. vol. 288, Issues 1-2, pp. 25-30, 2008.

Sato et al, "Tool Wear and Reactions in 304 Stainless Steel During Fiction Stir Welding", Materials Science Forum, vols. 275-677, pp. 731-734, 2011.

Parteder et al, "Bruchzahigkeit Und Porenverteilung Von Molybdan Stabmaterial in Abhangigkeit Des Reckgrades und Des Rekristallisationsgrades", Proceedings of the 14th International Plansee Seminar, vol. 1, 1997 (English Summary).

Written Opinion dated Dec. 19, 2017 in Int'l Application No. PCT/AT2016/060093.

Int'l Search Report dated Feb. 28, 2017 in PCT/AT2016/060093.

* cited by examiner

FRICTION STIR WELDING TOOL

CROSS-REFERENCE TO RELATED APPLICATION

This application is a Section 371 of International Application No. PCT/AT2016/060093, filed Oct. 31, 2016, which was published in the German language on May 4, 2017, under International Publication No. WO 2017/070725 A1, which claims priority under 35 U.S.C. § 119(b) to Austrian Application No. A 702/2015, filed Oct. 30, 2015, the disclosures of which are incorporated herein by reference in their entireties.

The present invention relates to friction stir welding tools of high-temperature-resistant metals or alloys and a manufacturing process therefor.

PRIOR ART

Friction stir welding is a welding procedure that has been known for approximately two decades and in which a tool, which consists of a rotationally symmetrical, usually cylindrical shaft having a pin with a small diameter on one end, the pin protruding from a shoulder region of the shaft, has its pin-side end brought into contact with workpieces to be joined and is set in rotation. Due to the rotation of the pin and the adjacent shoulder region as well as the frictional heat generated thereby, the materials of the workpieces to be joined are heated and become dough-like. As soon as the materials of the workpieces to be joined are sufficiently dough-like, the pin causes a thorough mixing of the materials of the workpieces to be joined in the joint region. Thereafter, when the workpieces cool down in the region of the engagement zone of the pin, a weld is formed that is improved in relation to welds produced by traditional methods and may, above all, be free form pores and/or unwanted structures.

This process overcomes several disadvantages of fusion welding, as it is a solid-phase process, thus avoiding well-known problems like coarse grain formation in the weld, shrinking effects during the solidification of the melt and unfavorable structures in the heat-affected zone.

Although it is still a young technology, friction stir welding has already been used in numerous fields of application, especially for welding workpieces of low-melting materials such as aluminum alloys. The procedure has also been introduced for welding light metals, especially sheet metals, in aerospace engineering, which is known to have high quality and reliability requirements.

Recently, there have been attempts to achieve the advantages achieved in friction stir welding in welding higher-melting materials like, for example, steel. So far, one problem has been that the employed friction stir welding tools often deform or wear out quickly at high welding temperatures. Furthermore, during the welding process, the peg or pin may become detached or break off, or the shaft itself may break.

The combination of high hot hardness, heat resistance and toughness (especially when rotating bending stress is present) as well as hot wear resistance required in the tools has not been achieved by commercially affordable materials to date, which is why the tool life time and life distance are unacceptably short. In contrast to tools for welding aluminum, these tools often achieve life distances of only a few meters.

The hot-working steels used in aluminum friction stir welding fail at the much higher temperatures occurring in friction stir welding of iron and steel materials. Likewise, tungsten carbide/cobalt hard metals fail due to softening of the cobalt binder. Tungsten/rhenium alloys show interesting potential: however, due to the very high price of rhenium, this solution is not feasible from a commercial point of view. Other refractory metals like molybdenum do show the desired heat resistance, but exhibit high wear, which negatively affects process reliability. Basically, however, when compared to ceramics or hard metals, refractory metals have the advantage that their contour can be re-processed after a corresponding wear and thus the tool can be reused several times.

Beside common failure mechanisms like abrasive wear or fatigue fracture, chemical interaction between a tool and the workpieces to be joined is an important factor, which is, however, hardly commented on in the literature. The high relative velocity of the involved components in combination with the high temperatures and applied pressures lead to tribochemical reactions, primary chemical interactions between the partners that can harm both the tool and the workpiece.

The most common tribochemical reaction, tribooxidation due to reaction of the involved components with the oxygen in the ambient air, can be avoided by carrying out the process in an inert gas atmosphere. However, the interdiffusion of the components of the tool and the workpieces or their reacting with one another cannot be avoided. This leads to work the piece material becoming attached and welded to the tool. When these attachments break off during the further process, tool material will also break off, and the tool surface is thus progressively destroyed. Such effects occur, for example, as early as in aluminum friction stir welding with tools made of hot working steel, after a certain period of use and quickly lead to failure of the tool.

Common chemical reactions of tool components with the workpieces also need to be contemplated. Cubic boron nitride, for example, which has been referred to as "super-abrasive" and recommended for friction stir welding tools due to its high hardness and wear resistance in patent literature (cf. US 2002/011509 A1), often decays very quickly under friction stir welding conditions when in contact with metal surfaces. This has been clearly proven for friction stir welding of Ti materials with cBN-containing tools (Y. Zang, Y. S. Sato, H. Kokawa, S. H. C. park and S. Hirano, "Stir zone microstructure of commercial purity titanium friction stir welding using pcBN tool", Materials Science and Engineering A, 488, 25-30 (2008)).

Another aspect is the contamination of the friction stir welds with material lost from the tool. As—due to the system—this loss cannot be avoided completely, it is desirable to have tool materials that do not have negative effects on mechanical or chemical properties (e.g. embrittlement of foreign phases) in the workpieces to be joined by dissolving in the base lattice to form a mixed crystal. Using pcBN tools for steel welding, σ phases and Cr-rich borides were found in the region of the stirring zone of the material. Especially in austenitic steels, this reduces the corrosion resistance in the weld, which should, however, be categorically avoided (Y. Sato, M. Muraguchi, H. Kokawa, "Tool Wear and Reactions in 304 Strainless Steel during Friction Stir Welding", Materials Science Forum, vol. 675-677, p. 731-734 (February 2011)).

In order to improve the mechanical properties of the tool material, especially at high temperatures, dispersoids enhancing structural stability, i.e. fine carbides, oxides, nitrides or borides with a mean particle diameter in the nanometer range, i.e. <1 μm, may be added by means of well-known techniques for monolithic refractory metals to increase hot hardness and heat resistance and reduce the tendency, especially of Mo and also W, towards structural coarsening at high temperatures (see, for example, G. Leichtfried, G. Thurner, R. Weirather, Proc. 14$^{th}$ Int. Plansee Seminar, Reutte, vol. 4, p. 26-43 (1997)).

Furthermore, carbides and other high-temperature-resistant materials are added in certain amounts to increase hot hardness and reduce wear. In GB 2.402.902 A of 2004, for example, a friction stir welding tool of tungsten or a tungsten-based alloy as mentioned above is disclosed, which preferably comprises a material for increasing robustness selected from rhenium, molybdenum, tantalum and niobium, especially rhenium in solid solution, preferably at an amount of approximately 40% by weight, and, in addition, may comprise one or more refractory carbides in a concentration of approximately 0.25 to approximately 2% by weight. Carbides of hafnium, zirconium, tantalum and niobium are given as examples for the latter. Manufacturing is, for example, carried out by means of cold isostatic pressing.

In EP 2.076.352 B1 and the underlying WO 2008/102209 A2, a friction stir welding tool having a shoulder portion of optionally alloyed W, Mo, Ta, Nb and/or Hf and a pin portion of one or more of Mo, W, Hf, Zr, Ta, Rh, Nb, Ir, V, alloys, carbides and oxides thereof is described, wherein the latter comprises especially carbides at 0.001 to 5% by weight and/or nitrides of La, Hf and/or Zr. Additionally, both portions may have a coating, e.g. a coating of ruthenium, silicides or carbides. Yet, possible oxides and carbides are mainly on the surface and occasionally only in the coating of the respective portion and are produced, for example, by magnetron sputtering or thermal spraying. Particle sizes of such oxides and carbides are not specified.

In US 2014/299651 A1, Mo-based friction stir welding tools are disclosed, which—analogously to GB 2.402.905 A as mentioned above—optionally comprise one or several refractory carbides of Hf, Zr, Ta and/or Nb. However, the amounts of these refractory carbides are not specified, and neither are particle sizes mentioned.

As mentioned at the beginning, the purpose of these well-known additives of carbides and oxides ("dispersoids"), which usually have particle sizes <1 μm, is to improve the structural stability or to increase the temperature resistance of the respective base alloy. Of course, this does not have noteworthy effects on the wear resistance or the friction coefficient of the tool.

US 2002/011509 A1 and further members of this patent family are the only documents know to the inventors that, for the latter purpose, disclose a friction stir welding tool with a coating of an abrasive material, in particular of polycrystalline boron nitride (PCBN) or polycrystalline diamond (PCD) with particle sizes in the range of below 1 μm to 50 μm. Such a coating with an abrasive material is, however, not intended to increase, but, contrary thereto, to lower friction between the tool and the workpiece due to the low friction coefficient of PCBN and PCB as compared to, for example, steel, and at the same time increase heat dissipation (see paragraphs [0098] and [0099] of US 2002/011509 A1). For this reason, heat barriers may occasionally be provided below the abrasive material coating to maintain a sufficient temperature at the weld. Chemical and physical vapor disposition (CVD, PVD) as well as ion implantation are mentioned as manufacturing processes for such coatings. However, not a single specific exemplary embodiment for said friction stir welding tool is disclosed in US 2002/011509 A1, which is why this invention and disclosure seem to be of purely theoretical nature.

However, apart from the necessity of heat barriers, the disadvantage of such friction stir welding tools is or would be the continued high wear due to the lack of chemical stability of the abrasive material coatings, as the inventors have found in the course of their research.

Against this background, the aim of the invention was to provide a friction stir welding tool with which the above disadvantages can be overcome at least in part.

DISCLOSURE OF THE INVENTION

This aim is achieved, in a first aspect of the present invention, by providing a friction stir welding tool comprising a rotationally symmetrical shaft 1 having a proximal end intended for contact with joint partners and a distal end opposed thereto, and a pin 2, which is arranged concentrically about the rotation axis and which has a smaller diameter than the shaft at the proximal end thereof and thus projects as compared to a shoulder region 3 of the shaft 1 defined thereby, wherein the shaft 1, at least in the shoulder region 3, and the pin 2 each consist of a material which is selected from high-temperature-resistant metals and alloys and optionally contains structural-stability-enhancing dispersoids such as carbides, oxides, nitrides and borides having a particle size in the nanometer range, characterized in that the pin 2 and/or the shaft 1 in the shoulder region 3 consist(s) of or is/are coated with a composite material, which a) substantially consists of molybdenum, tungsten, niobium or tantalum or of an alloy based on at least one of said metals; and b) comprises a reinforcement phase embedded therein and consisting of at least one hard material having a Mohs hardness ≥6, a particle size in the micrometer range and a free enthalpy of formation at 1300K of less than −350 kJ/mol $O_2$.

By including the reinforcement phase according to the invention in a friction stir welding tool substantially consisting of molybdenum, tungsten, niobium and/or tantalum or by coating the tool in the shoulder region, the wear resistance of the tool could be improved considerably as compared to the prior art. By embedding the relatively coarse particles of the reinforcement phase, which preferably comprises one or several hard materials having a particle size in the region of 3 to 200 μm, preferably 5 to 200 μm, more preferably 10 to 200 μm, these are uniformly distributed in the metal base and considerably better protected from breaking off as is the case in prior-art hard materials generated only on the surface. In addition, the grain size, which is increased by several powers of ten as compared to dispersoids, causes an even substantially larger increase in the surface area, which enhances the mechanical stability of the compound and results in drastically longer life times of the tool. The chemically inert behavior of the hard material towards the workpieces to be joined, which is due to the strongly negative free enthalpy of formation (more negative than −350 kJ/mol $O_2$), considerably decreases the tendency of workpiece materials being welded to the tool and thus minimizes the damage related thereto and the formation of unwanted phases after inclusion in the material to be joined.

Among the metals and alloys thereof which are suitable as a base for the compound material according to the invention, i.e. Mo, W, Nb and Ta (and theoretically Os, which will, however, be hardly relevant due to its high price), Mo, W and alloys based thereof are especially preferred as main components of the compound material due to their low solubility for and in iron and aluminum (two of the most commonly used join partner components in friction stir welding) and the low diffusion coefficients and velocities of the individual metals in such combinations, as thus the formation of unwanted phases and the welding of workpiece material to the tool can be further decreased.

In preferred embodiments, the at least one hard material is contained in the material at a percentage of 5 to 30% by volume, preferably 10 to 20% by volume, and thus contained in an amount that is far higher than the amount in which fine-grained hard materials have been employed as dispersoids so far, and further boosts the wear-reducing effect of the invention.

The at least one hard material of the reinforcement phase is preferably selected from aluminum oxide, zirconium oxide, yttrium oxide and mixtures thereof, as these materials have an especially high thermodynamic stability and thus do not or only slightly react with the workpiece materials like steel, stainless steel, aluminum alloys and super alloys. Despite their exceptionally high hardness, the abrasive materials of PCBN and PCD disclosed in US 2002/011509 A1, which has been mentioned at the beginning, are completely unsuitable for tools according to the present invention, as their enthalpy of formation is (far) too high (standard enthalpy of formation $\Delta H_r^0$: boron nitride −254.4 kJ/mol, diamond +1.9 kJ/mol; $\Delta H_r$ for CBN at 1300 K: −254 kJ/mol) and thus (very) easily undergo reactions with the material of the join partners.

Furthermore, the material of the friction stir welding tool according the invention may comprise—as is generally known—dispersoids having particle diameters in the nanometer range and in an amount of up to 5% by weight to make use of the effect of structural stability enhancement of these additives.

The arrangement of the compound material in or at the inventive tool is not specifically limited, and both the pin and the shoulder region or even the common shaft, i.e. the entire tool, may consist of the compound material. However, mainly for financial reasons, only parts of the tool, preferably the pin, will completely consist of the compound material, while other parts, preferably the shoulder region of the shaft, will only be coated with a layer consisting of the compound material. In an especially preferred embodiment, the compound material is provided on all parts that get into contact with the join partners during the welding process.

The tool according to the invention may be manufactured by generally known powder metallurgic methods, for example analogously to the manufacturing of the materials of TZM or MHC, which are industrially manufactured, so that the new tools may be manufactured in existing manufacturing plants. An exemplary procedure will be given in the examples below.

In another aspect, the invention provides the use of the friction stir welding tool according to the first aspect in a welding process, i.e. a friction stir welding process characterized by using said friction stir welding tool as the tool.

BRIEF DESCRIPTION OF THE DRAWINGS

In the examples below, the present invention is described in more detail with reference to the appended drawings, which show the following.

EXAMPLES

General Description of the Procedure

In the comparative example below and an example of the present invention, at first friction stir welding tools were manufactured according to the same generally known process, wherein the process comprised:

mixing the base metal powder with the hard material powder (with optional dispersoids being mixed with the latter prior thereto), e.g. by means of a tumble mixer, for 30 mins;

consolidating the powder mixture by cold isostatic pressing, e.g. at 300 MPa;

pre-sintering under a reducing atmosphere, e.g. under hydrogen, at 1200° C. for 60 mins;

encapsulation in gas-tight steel vessels, evacuation and welding;

hot isostatic compaction, e.g. at 1300° C.;

removal of the capsule by a chip-removing process (face lathing)

hot forming, e.g. hot rolling at a pre-heating temperature of 1200° C.;

wherein the last two steps may be carried out in reverse order.

Subsequently, the thus obtained tools were subjected to a life time test. To this aim, various tool materials were tested at an aluminium alloy under the same basic conditions. The welding parameters were identical for all tools and were designed for a specific industrial application. After a certain welding distance, the tools were examined for wear.

The thereby obtained surfaces were visually inspected and compared. Photographs of the respective surfaces are shown in the appended FIGS. 1 to 3.

Comparative Examples 1 and 2

In these examples, tools were, on the one hand, manufactured from the hot working steel EN X40CrMoV5-1, which was subsequently hardened to 54 HRC (Comparative Example 1) and, on the other hand, from Iconel® Alloy 718, NiCr19NbMo, a nickel-based alloy (Comparative Example 2). These materials are often mentioned for their use as friction stir welding tools in technical literature (see, for example, Y. N. Zhang, X. Cao*, S. Larose and P. Wanjara, "Review of tools for friction stir welding and processing", Can. Metall. Quart. 51(3), 250-261 (2012)). Photographs of the thereby obtained tool surfaces are shown in FIGS. 1 and 2.

Figure 1:
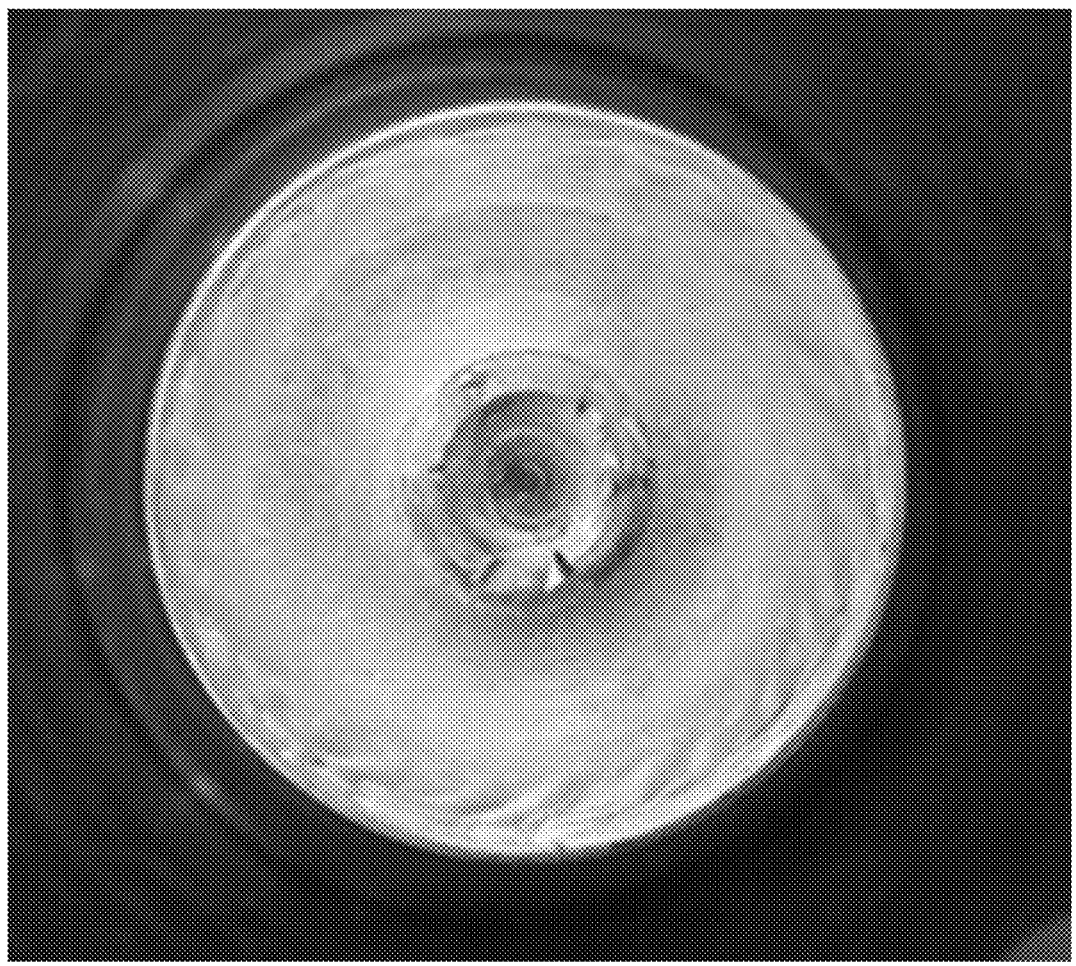
FIG. 1 is a photograph of the surface of a prior-art friction stir welding tool of Comparative Example 1.

The formation of chatter marks on the shoulder is clearly visible in FIG. 1 which is a picture of the friction stir welding tool of Comparative Example 1 after a welding distance of 650 m. These chatter marks form due to the poor chemical resistance of the tool material when it is in contact with the workpiece material during the friction stir welding process. Due to the stirring movement, a local material compound is formed from portions of the tool and the workpiece, whereby bulk portions of the tool material are torn out of the tool. FIG. 1 shows this volume loss very clearly in addition to the chatter marks.

Figure 2:
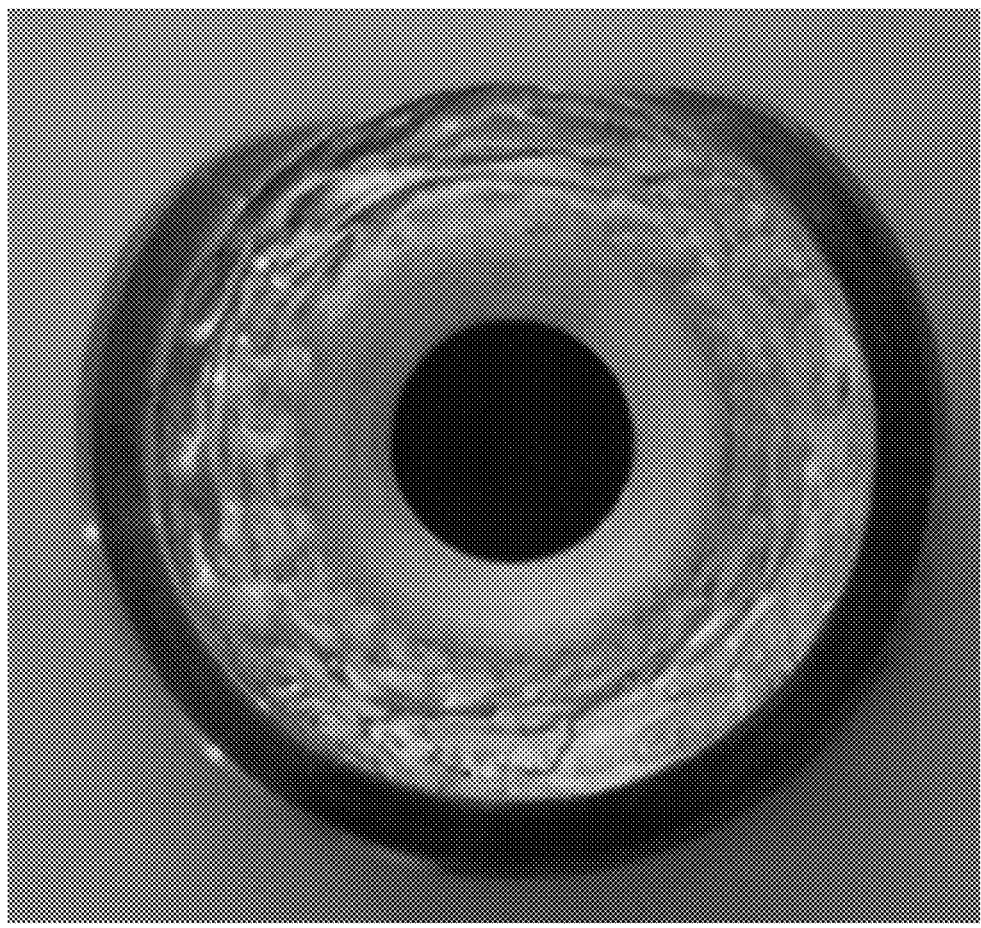
FIG. 2 is a photograph of the surface of a prior-art friction stir welding tool of Comparative Example 2.

In FIG. 2, the corresponding surface of the friction stir welding tool of Comparative Example 2 is illustrated after a welding distance of 400 m. The corresponding chatter marks and chemical wear are also very clearly visible.

Example 1

An illustrative friction stir welding tool according to the present invention was produced from the following components by the above process:

molybdenum powder (Ø<32 μm);
10% by volume of fused corundum (blocky, Ø 25-63 μm);
0.5% by weight of HfC (Ø<1 μm; dispersoid).

The thus obtained fusion stir welding tool according to the invention was subjected to an analogous test to the one performed for the tools of the comparative examples.

Figure 3:
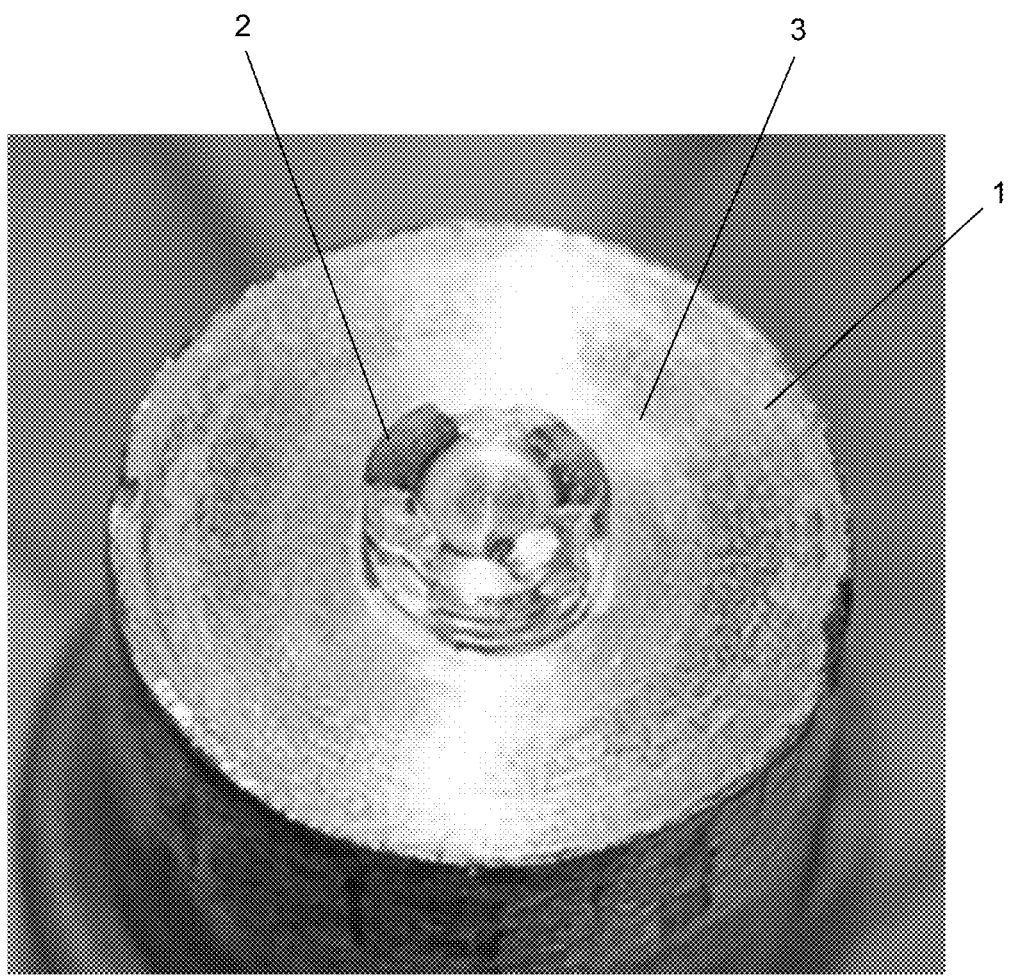
FIG. 3 is a photograph of the surface of a friction stir welding tool of Example 1.

FIG. 3 is a photograph of a surface of the inventive tool after a welding distance of 1500 m. Here, in contrast to the prior art, only relatively minor abrasive wear is visible. Moreover, due to the better chemical resistance, hardly any interaction with the workpiece had occurred.

Such an inventive tool thus makes it possible to achieve considerably higher life times than have been achieved in the prior art.

At the moment, further tests with additional embodiments of the present invention are carried out.

In conclusion, the invention provides friction stir welding tools having considerably improved chemical stability, which offer extraordinary economic advantages in the field of friction stir welding.

The invention claimed is:

1. A friction stir welding tool comprising:
a rotationally symmetrical shaft having a proximal end intended for contact with joint partners and a distal end opposed thereto, and a pin, which is arranged concentrically about a rotation axis and which has a smaller diameter than the shaft at the proximal end thereof and thus projects as compared to a shoulder region of the shaft defined thereby,
wherein the shaft, at least in the shoulder region, and the pin each consists of or is coated with a compound material which comprises a metal base substantially consisting of one or more metals selected from the group consisting of molybdenum, tungsten, niobium, tantalum, and an alloy based on at least one of these metals, and hard material particles embedded in the metal base, the hard material particles having a Mohs hardness ≥6, and
wherein the hard material particles embedded in the metal base comprise at least one hard material which forms a reinforcement phase in the metal base, the hard material particles having a particle size in the range of 3 to 200 μm and being uniformly distributed in the metal base, the at least one hard material having a free enthalpy of formation at 1300 K that is more negative than −350 kJ/mol $O_2$, and
wherein the at least one hard material is contained in the compound material at a percentage of 5 to 30% by volume.

2. The tool according to claim 1, wherein the at least one hard material of the reinforcement phase is selected from the group consisting of aluminum oxide, zirconium oxide, yttrium oxide, and mixtures thereof.

3. The tool according to claim 1, wherein the metal base substantially consists of Mo and/or W, or of an alloy based thereon.

4. The tool according to claim 1, wherein the compound material further comprises dispersoids having particle diameters in the nanometer range, in an amount of up to 5% by weight.

5. The tool according to claim 1, wherein the pin consists of the compound material, and wherein the shoulder region of the shaft is coated with a layer consisting of the compound material.

6. A friction stir welding process comprising using the friction stir welding tool according to claim 1 as a tool.

7. The tool according to claim 1, wherein the reinforcement phase comprises one or several hard materials having particle sizes in the range of 5 to 200 μm.

8. The tool according to claim 7, wherein the reinforcement phase comprises one or several hard materials having particle sizes in the range of 10 to 200 μm.

9. The tool according to claim 1, wherein the at least one hard material is contained in the compound material at a percentage of 10 to 20% by volume.

* * * * *